(12) United States Patent
Peake et al.

(10) Patent No.: US 11,816,874 B2
(45) Date of Patent: Nov. 14, 2023

(54) PLANT IDENTIFICATION USING HETEROGENOUS MULTI-SPECTRAL STEREO IMAGING

(71) Applicant: Blue River Technology Inc., Sunnyvale, CA (US)

(72) Inventors: John William Peake, Mountain View, CA (US); James Patrick Ostrowski, Mountain View, CA (US)

(73) Assignee: BLUE RIVER TECHNOLOGY INC., Sunnyvale, CA (US)

( * ) Notice: Subject to any disclaimer, the term of this patent is extended or adjusted under 35 U.S.C. 154(b) by 191 days.

(21) Appl. No.: 17/396,454

(22) Filed: Aug. 6, 2021

(65) Prior Publication Data

US 2022/0044044 A1 Feb. 10, 2022

Related U.S. Application Data

(60) Provisional application No. 63/063,153, filed on Aug. 7, 2020.

(51) Int. Cl.
| | | |
|---|---|---|
| *G06T 7/90* | (2017.01) | |
| *G06V 10/143* | (2022.01) | |
| *H04N 13/25* | (2018.01) | |
| *H04N 13/257* | (2018.01) | |
| *H04N 13/271* | (2018.01) | |

(Continued)

(52) U.S. Cl.
CPC .......... *G06V 10/143* (2022.01); *A01B 79/005* (2013.01); *A01C 21/005* (2013.01); *A01M 7/0089* (2013.01); *G06F 18/214* (2023.01); *G06F 18/25* (2023.01); *G06T 7/593* (2017.01); *G06T 7/90* (2017.01); *G06V 10/56* (2022.01); *G06V 20/56* (2022.01); *H04N 13/25* (2018.05); *H04N 13/257* (2018.05); *H04N 13/271* (2018.05); *H04N 23/11* (2023.01); *G06T 2207/10024* (2013.01); *G06T 2207/10036* (2013.01); *G06T 2207/20081* (2013.01);

(Continued)

(58) Field of Classification Search
CPC ...... G06V 10/143; G06V 10/56; G06V 20/56; G06V 10/58; G06V 10/803; G06V 10/82; G06V 20/60; G06V 20/647; A01B 79/005; A01C 21/005; A01M 7/0089; G06F 18/214; G06F 18/25; G06T 7/593; G06T 7/90; G06T 2207/10024; G06T 2207/10036; G06T 2207/20081; G06T 2207/20084; G06T 2207/30188; H04N 13/25; H04N 13/257; H04N 13/271; H04N 23/11; H04N 2013/0081; H04N 2013/0092; H04N 25/131; H04N 25/134
USPC .......................................................... 382/110
See application file for complete search history.

(56) References Cited

U.S. PATENT DOCUMENTS 10,992,921 B1 * 4/2021 Cui .................. B64C 39/024
11,481,918 B1 * 10/2022 Ebrahimi Afrouzi ......................
A47L 11/4061

(Continued)

*Primary Examiner* — Ali Bayat
(74) *Attorney, Agent, or Firm* — Fenwick & West LLP

(57) ABSTRACT

A farming machine identifies and treats a plant as the farming machine travels through a field. The farming machine includes a pair of image sensors for capturing images of a plant. The image sensors are different, and their output images are used to generate a depth map to improve the plant identification process. A control system identifies a plant using the depth map. The control system captures images, identifies a plant, and actuates a treatment mechanism in real time.

20 Claims, 12 Drawing Sheets

(51) Int. Cl.
*A01B 79/00* (2006.01)
*A01C 21/00* (2006.01)
*A01M 7/00* (2006.01)
*G06T 7/593* (2017.01)
*G06V 10/56* (2022.01)
*G06V 20/56* (2022.01)
*G06F 18/25* (2023.01)
*G06F 18/214* (2023.01)
*H04N 23/11* (2023.01)
*G06V 10/58* (2022.01)

(52) U.S. Cl.
CPC .............. *G06T 2207/20084* (2013.01); *G06T 2207/30188* (2013.01); *G06V 10/58* (2022.01)

(56) References Cited

U.S. PATENT DOCUMENTS

| | | | |
|---|---|---|---|
| 2012/0101747 A1* | 4/2012 | Kielkopf | G01M 3/38 |
| | | | 702/50 |
| 2017/0277966 A1* | 9/2017 | Abousleman | G06V 10/25 |
| 2019/0236358 A1* | 8/2019 | Tokumaru | G06V 20/188 |
| 2020/0225673 A1* | 7/2020 | Ebrahimi Afrouzi | ........ |
| | | | G05D 1/0044 |
| 2020/0236870 A1* | 7/2020 | Lys | G01N 33/0098 |

* cited by examiner

PLANT IDENTIFICATION USING HETEROGENOUS MULTI-SPECTRAL STEREO IMAGING

CROSS REFERENCE TO RELATED APPLICATIONS

This application claims the benefit of U.S. Provisional Application No. 63/063,153, filed Aug. 7, 2020, which is incorporated by reference in its entirety.

TECHNICAL FIELD

The described subject matter generally relates to farming technology, and, in particular, to the identification and treatment of plants.

BACKGROUND

Conventional systems for treating crops in a field broadly apply treatment to all plants in the field or to entire zones of plants within the field. These systems have significant drawbacks as they often apply the same treatment to the entire field of plants. For example, in the case of a spray type treatment, treatment fluid is applied throughout the zone or field, resulting in significant waste. When the treatment is a nitrogen-containing fertilizer, excess treatment may be harmful to the environment. Further, in conventional spray treatment systems, crops and weeds are treated collectively. Thus, in the case of fertilizer treatments, weeds may benefit from treatment unless separate effort is expended to remove weeds before treatment.

It is currently difficult to apply treatments to individual plants rather than large areas of the field. In an example, farmers manually apply treatments to individual plants, such that the treatments do not affect both weeds and crops. This and similar methods are exceptionally labor-intensive and costly when performed at industrial scale. While some conventional farming systems use imaging technology to identify and treat crops in a field (e.g., satellite imaging, color imaging, thermal imaging, etc.), many of these systems are limited in their ability to properly identify and treat plants at the individual plant level. In particular, these systems can be limited by cost and processing capabilities of image sensors. For example, satellite images have poor resolution for detecting individual plants and color-based imaging systems treat all green plants equally whether they are a weed or a crop.

SUMMARY

As a farming machine travels through a field of plants, the farming machine uses an image acquisition system including a pair of image sensors to detect a plant for treatment. A first image sensor of the image acquisition system is configured to produce color images including a plurality of color pixels and a second image sensor of the image acquisition system is configured to produce multispectral images including a plurality of infrared pixels. Together, a color image and a multispectral image capturing a similar field of view forms a stereo image pair. The farming machine also includes a plant treatment mechanism for treating detected plants as the farming machine travels through the field.

The farming machine also includes a controller that generates a depth map based on bands of light common to each image in a stereo image pair, which the farming machine can use to identify plants. The farming machine uses the color image for labeling plants, e.g., crops and weeds, using machine learning, and the multispectral image for segmenting vegetation from the ground, e.g., using the Normalized Difference Vegetation Index (NDVI). Using the depth map, color image, and multispectral image, the farming machine can better treat plants, such as by determining with high confidence the locations of crops and weeds, determining adjustments to boom height for appropriate plant treatment, and choosing the correct nozzles of the plant treatment mechanism for plant treatment.

Figure 1A:
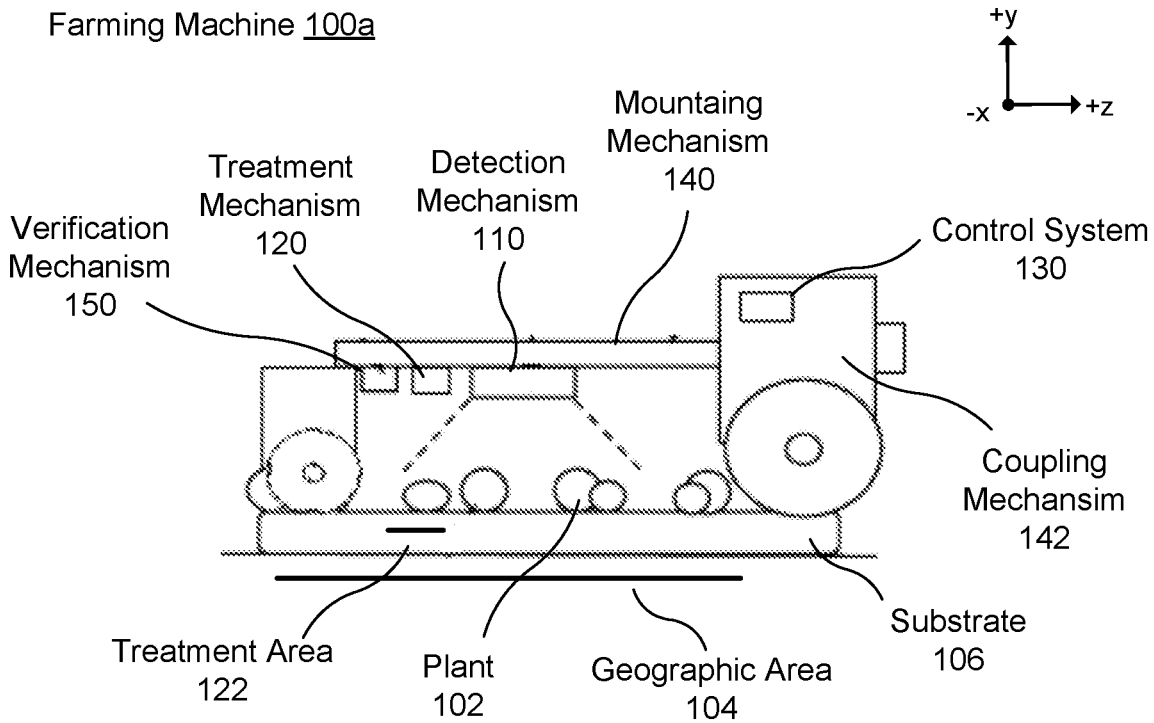
FIG. 1A illustrates a side view of a farming machine, in accordance with a first example embodiment.

The figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality

DETAILED DESCRIPTION

I. Introduction

A farming machine includes an automated or semi-automated system for identifying and treating plants in a field. The farming machine employs an image acquisition system to detect plants for treatment as the farming machine travels through the field. The image acquisition system includes one or more image sensors (e.g., cameras) physically coupled to the farming machine to capture one or more images of one or more plants. A control system identifies a plant in the one or more images and actuates a treatment mechanism coupled to the farming machine to treat the identified plant. As such, the farming machine is configured to target and treat plants individually, thus reducing waste and preventing plant growth resulting from treatments that are applied liberally across a field. Using an automated system also reduces manual labor and other costs associated with treating plants individually, improving farming efficiency.

Automatically treating plants with farming machines including a control system and image acquisition system is a complex process. In particular, plant identification algorithms are computationally expensive and, oftentimes, sacrifice plant identification speed in favor of plant treatment accuracy and vice versa. This speed/accuracy interplay affects the efficiency of farming operations. For example, a first farming machine may move quickly through the field treating plants with less accuracy, while a second farming machine may move more slowly through the field treating plants with more accuracy. However, in both examples, the farming machine is performing at less than optimal efficiencies. Ideally, a farming machine would move through the field quickly while simultaneously identifying and treating plants with a high degree of accuracy.

A key factor in determining the speed and/or accuracy of a farming machine in treating plants is the one or more image sensors of the image acquisition system. There are a variety of image sensors with different characteristics, benefits, and drawbacks, such as field of view, shutter speed, resolution, electromagnetic spectrum sensitivity, durability, and cost. For example, different digital cameras may capture different ranges of the electromagnetic spectrum and have different fields of view. Different combinations of image sensors provide different benefits and drawbacks as well. As described in greater detail below, a pair of image sensors including a first image sensor configured to produce color images and a second image sensor configured to produce multispectral images provides various benefits to plant identification.

A farming machine employing a pair of image sensors tilted downwards towards a plant (or field) allows for a control system to capture a plurality of images, identify a plant, and apply a treatment to the identified plant within a short time period without sacrificing accuracy and precision. Key to this improvement is that the pair of image sensors have differing electromagnetic spectrum sensitivities. In particular, as described in greater detail below, images captured using the pair of image sensors are combined to produce data of superior utility for plant recognition, and therefore treatment actuation.

The farming machine is configured to process images obtained by a pair of image sensors to accurately identify and treat plants in a field. Herein, processing an image (more generally "image processing") includes (i) applying any number of functions to the image to modify the image ("modification functions"), and (ii) employing a plant identification model to identify plants in an image ("plant identification"). Each image sensor in a pair of image sensors may include various properties ("sensor properties") that affect image processing. Sensor properties may be, for example, described in one of two groups: (i) physical properties, and (ii) changeable properties (i.e., "settings"). Some physical properties may include, for example, lens size, lens type, lens tilt, processing capabilities, etc. Some changeable properties may include, for example, aperture, lens tilt, zoom, ISO speed, exposure, flash, lens filter, flash, etc.

As described above, sensor properties may affect image processing. For example, sensor properties may affect characteristics of an image obtained by an image sensor ("image characteristics"). Some image characteristics may include, for example, image pixilation, image resolution, image size, image shape, etc. A farming machine may employ different modification functions based on the image characteristics. Some modification functions include, for example, cropping, value normalization, image aggregation, filtering, etc. Image modification using modification functions is described in more detail below. Further, a farming machine may employ a plant identification model affected by image characteristics. To illustrate, the image characteristics may affect the accuracy, precision, and/or speed of plant identification by a plant identification model.

Additionally, the fields of view of each of a pair of image sensors may be affected by sensor properties. A field of view, herein, is the angular extent of an area captured by an image sensor. Thus, the area captured by an image sensor may be affected by sensor properties. For example, the field of view may be based on the size of the image sensor (e.g., the size of the lens) and the focal length. The field of view may also depend on the orientation of the image sensor. For example, an image sensor in a downwards orientation may generate an image representing an approximately rectangular area, while a tilted image sensor may generate an image representing an approximately trapezoidal area. More generally, image processing is a complex process that is contingent on the interdependency of all the above factors (e.g., sensor properties affect image characteristics and field of view, image characteristics and field of view affect image modification, image modification affects plant identification, etc.). The image sensors in a pair of image sensors may have the same field of view or overlapping fields of view, depending upon the embodiment. The extent to which the fields of view overlap may depend upon a configuration of the image sensors, a configuration of the farming machine, and/or the image processing techniques employed by the farming machine.

A farming machine with a pair of image sensors includes a control system configured to identify and treat plants using images generated by the pair of image sensors despite the complexity of the problem. The control system employs the pair of image sensors to capture images of a plant as the farming machine travels through the field, and, subsequently, uses the captured images to produce a stereo image pair that includes depth information. The control system uses the stereo image pair to identify plants for treatment and adjust the farming machine to optimize plant treatment.

In some embodiments, the pair of image sensors is one of an array of pairs of image sensors, and the control system generates, for each image sensor pair, a stereo image pair of one or more plants based on images captured by the image sensor pair of the array. Alternatively, in an embodiment, the farming machine includes a plurality of image sensors, such as color image sensors and multispectral image sensors, which are interleaved. The control system employs various combinations of the interleaved image sensors to produce stereo image pairs, for example, using a first color image sensor and its left neighboring multispectral image sensor as a first pair of image sensors, then using the first color image sensor and its right neighboring multispectral image sensor as a second pair.

The control system identifies multiple plants in the stereo image pair, allowing the farming machine to apply a targeted treatment to multiple plants as the farming machine travels through the field. The control system applies one or more modification functions to the stereo image pair to modify the images for the plant identification process. For example, the control system may apply one or more modification functions to minimize inconsistencies in captured images caused by vibrations of the mounting mechanism as the farming machine moves through the field, or to crop the stereo image pair to only an overlapping field of view common to both images. The control system actuates a treatment mechanism to treat identified plants in the stereo image pair. The treatment mechanism applies the treatment to an individual plant as the farming machine travels over the plant. The control system may additionally manipulate one or more features of the farming machine, such as a boom height or a tilt of one or more treatment mechanisms, based on a stereo image pair.

In an embodiment, the control system applies a modification function to the multispectral image to rectify its red and green bands (spectral bands of light) by subtracting the blue band from those bands. Because all of the pixels are sensitive in the infrared range, there's a part of the infrared signal that gets through to each of the pixels. Even though blue light is filtered from the image, the blue pixels of the image sensor respond to the infrared signal, and the red and green pixels respond to the infrared signal and red or green light, respectively. As such, to account for the extra infrared signal in the red and green bands, the control system subtracts the blue signal, which consists of the infrared signal, from the red and green bands to get true red and true green signals in the image. This rectification improves the comparability of the light bands in the multispectral image for stereo depth determination in conjunction with a color image, as described below.

II. Plant Treatment System

Figure 1B:
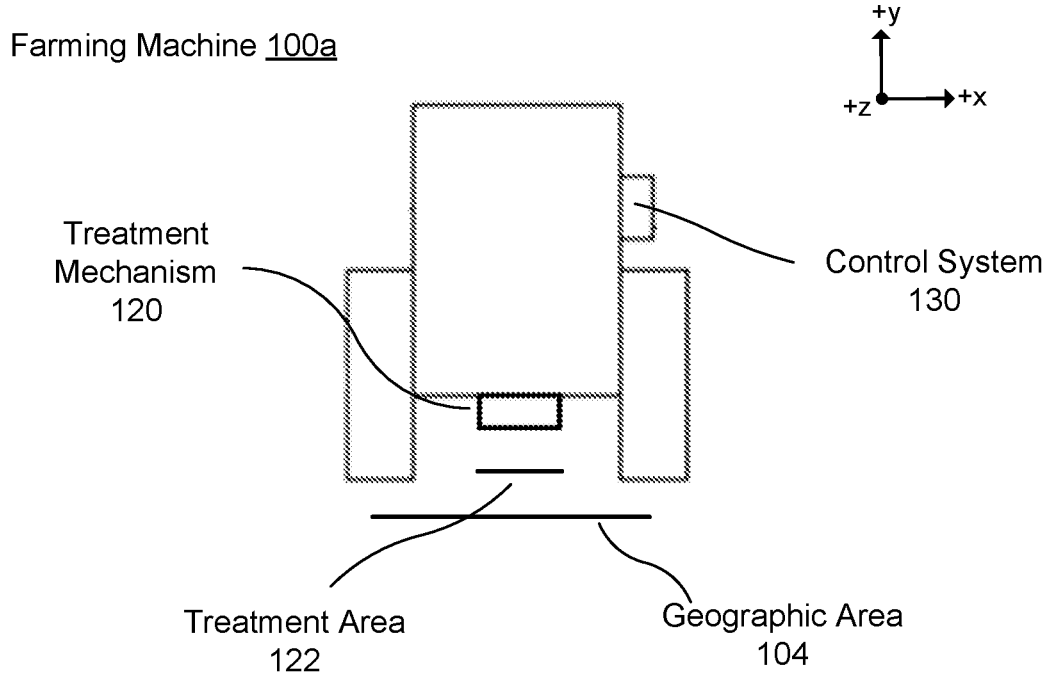
FIG. 1B illustrates a front view of a farming machine, in accordance with the first example embodiment.
Figure 1C:
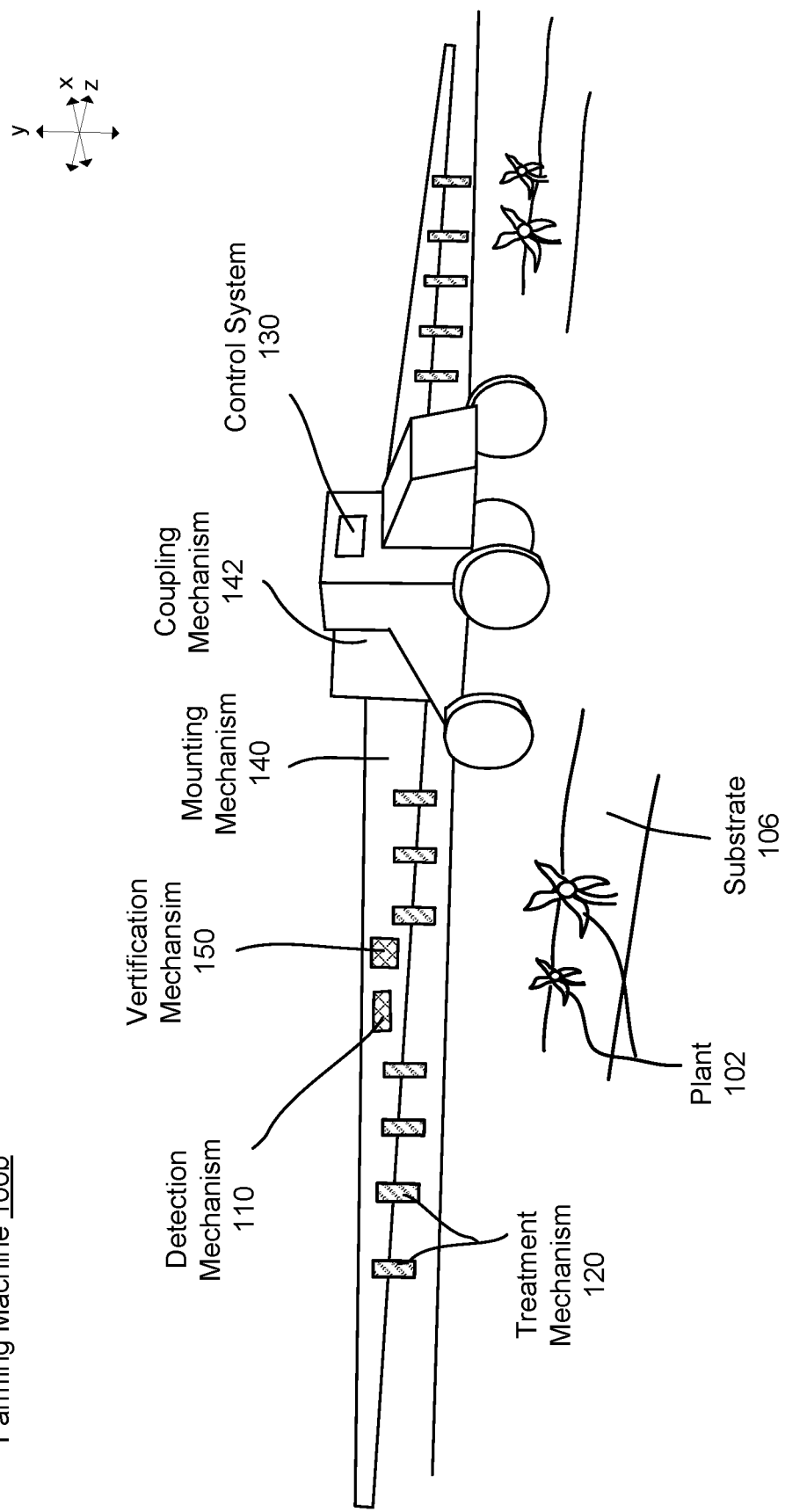
FIG. 1C illustrates an isometric view of a farming machine, in accordance with a second example embodiment.
Figure 1D:
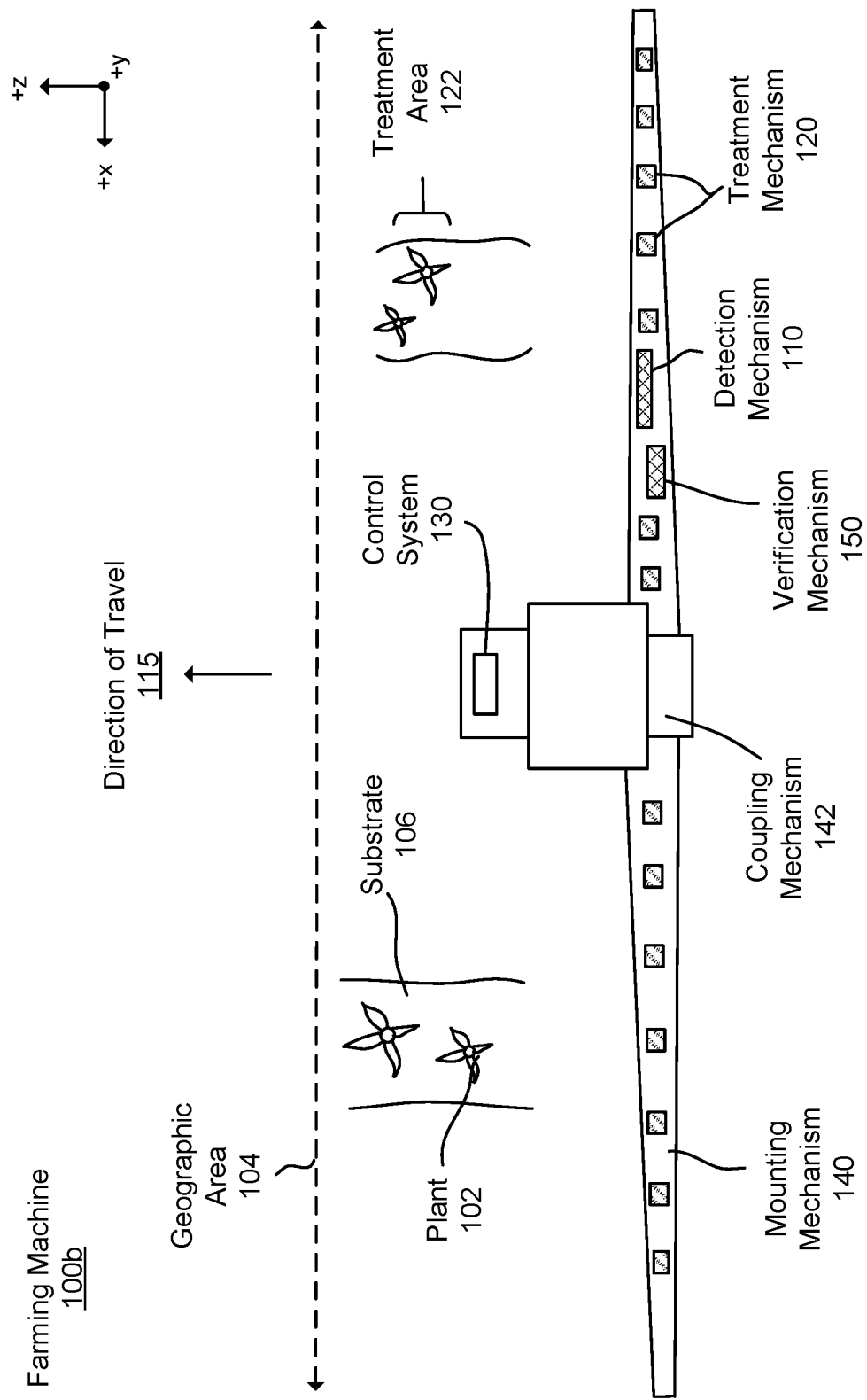
FIG. 1D illustrates a top view of a farming machine, in accordance with the second embodiment.
Figure 1E:
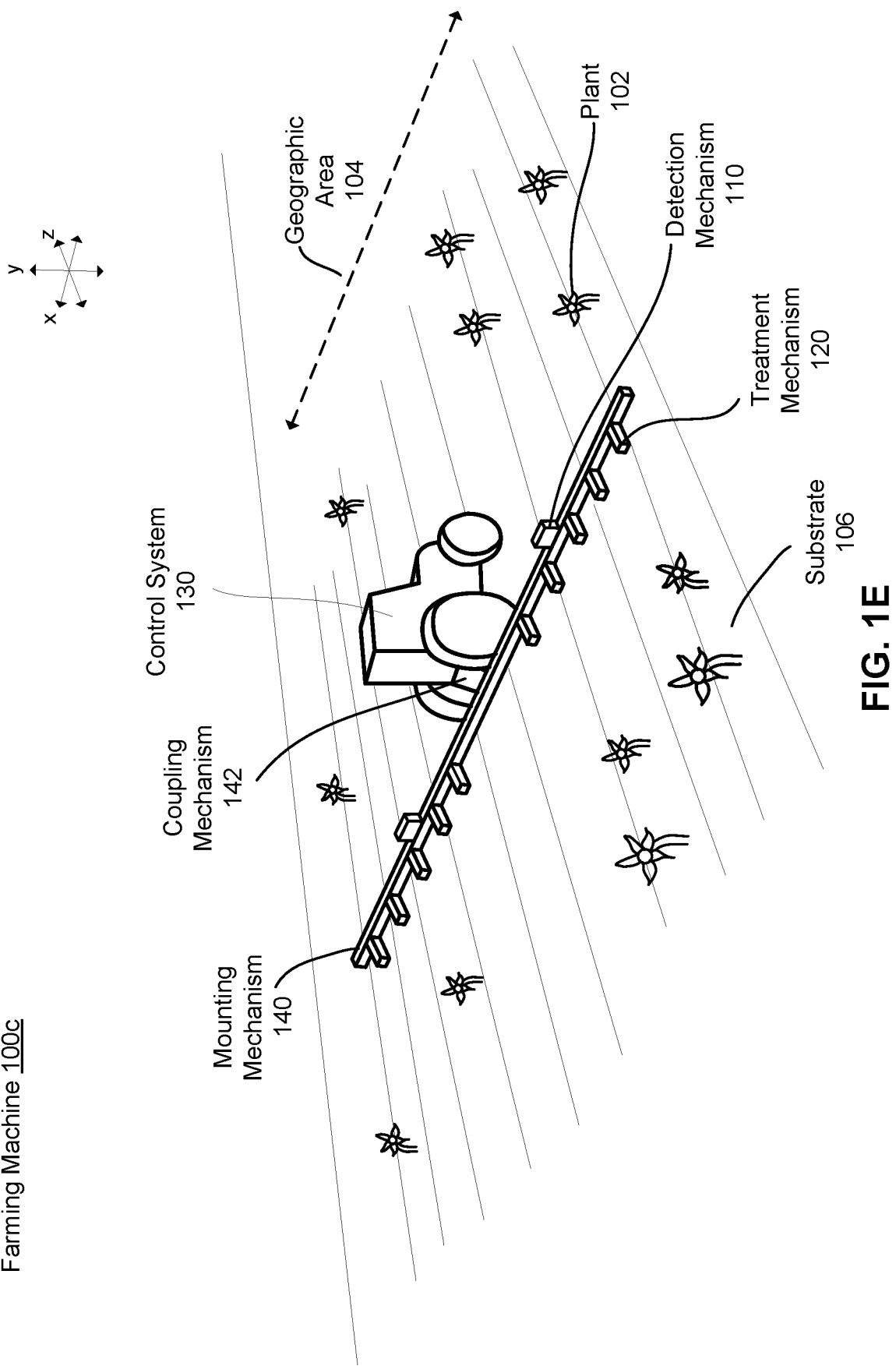
FIG. 1E illustrates an isometric view of a farming machine, in accordance with a third example embodiment.

A farming machine that identifies and treats plants may have a variety of configurations, some of which are described in greater detail below. For example, FIG. 1A is a side view of a first embodiment of a farming machine and FIG. 1B is a front view of the first embodiment of the farming machine of FIG. 1A. FIG. 1C is an isometric view of a second embodiment of a farming machine and FIG. 1D is a top view of the second embodiment of the farming machine of FIG. 1C. FIG. 1E is a third embodiment of a farming machine, in accordance with one embodiment. The farming machine 100, illustrated in FIGS. 1A-1E, includes a detection mechanism 110 (alternatively "image acquisition system"), a treatment mechanism 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below.

The farming machine 100 functions to apply a treatment to one or more plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent the plant.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g. same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate.

Figure 2A:
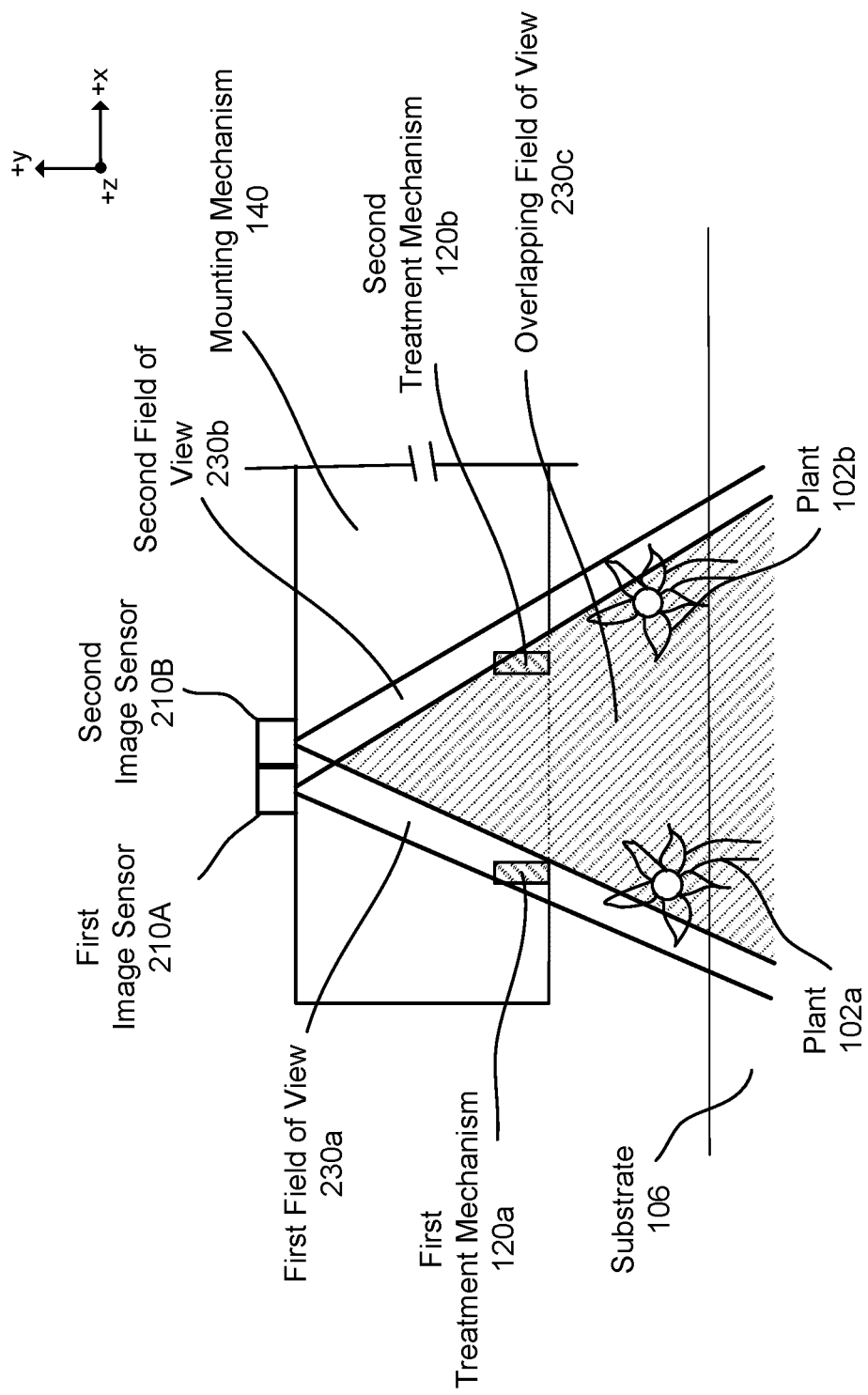
FIG. 2A illustrates a front view of a portion of a farming machine with a pair of image sensors having different fields of view, in accordance with an example embodiment.
Figure 2B:
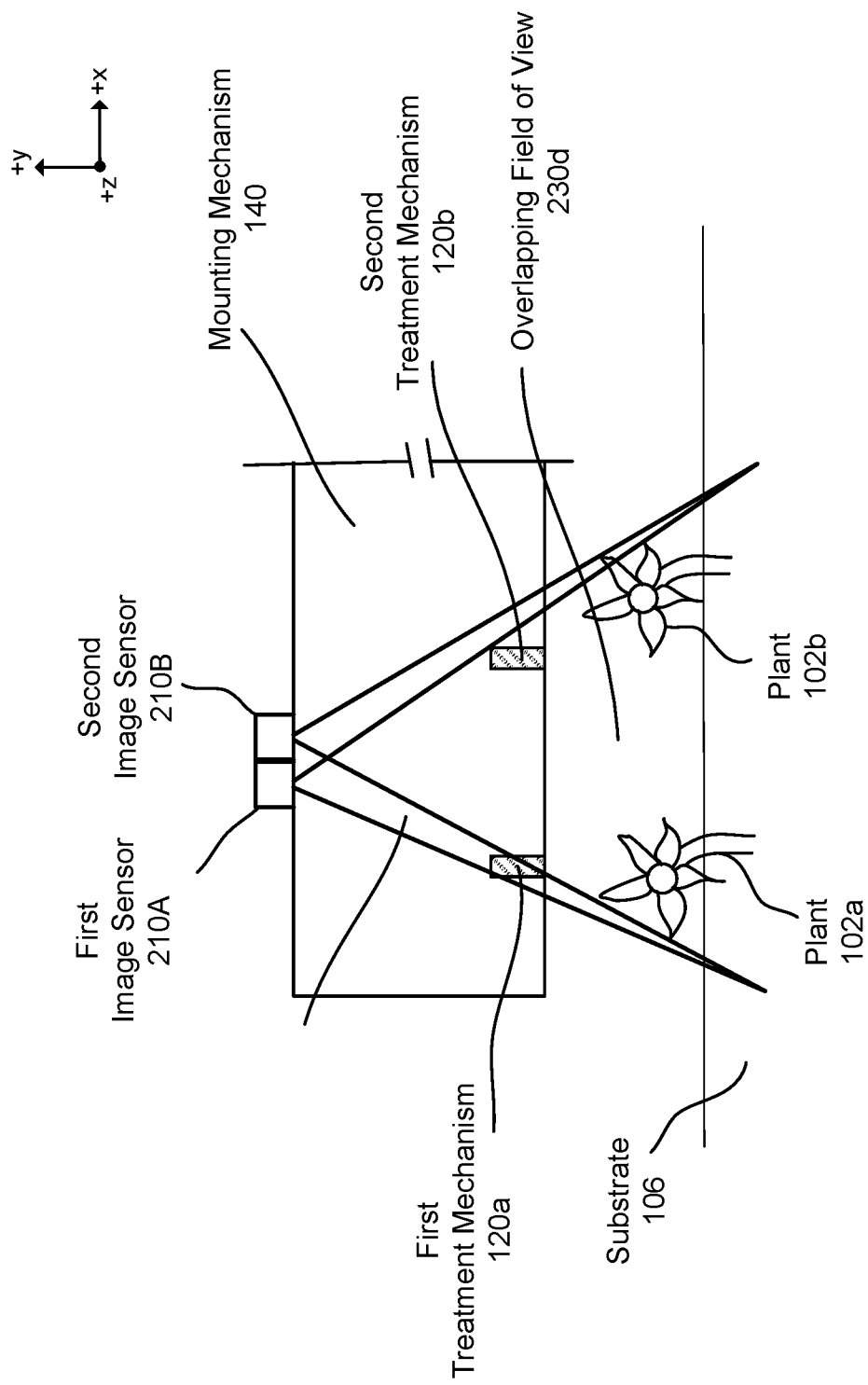
FIG. 2B illustrates a front view of a portion of a farming machine with a pair of image sensors having wholly overlapping fields of view, in accordance with an example embodiment.

The detection mechanism 110 is configured to identify a plant for treatment. As such, the detection mechanism 110 can include one or more sensors for identifying a plant. For example, the detection mechanism 110 can include a color camera, a multispectral camera, a stereo camera, a CCD camera, a single lens camera, hyperspectral imaging system, LIDAR system (light detection and ranging system), dynamometer, IR camera, thermal camera, humidity sensor, light sensor, temperature sensor, or any other suitable sensor. In the embodiment of FIGS. 2A-2B and described in greater detail below, the detection mechanism 110 includes an array of image sensors configured to capture an image of a plant. In some example systems, the detection mechanism 110 is mounted to the mounting mechanism 140, such that the detection mechanism 110 traverses over a geographic location before the treatment mechanism 120 as the farming machine 100 traverses through the geographic location. However, in some embodiments, the detection mechanism 110 traverses over a geographic location at substantially the same time as the treatment mechanism 120. In an embodiment of the farming machine 100, the detection mechanism 110 is statically mounted to the mounting mechanism 140 proximal the treatment mechanism 120 relative to the direction of travel 115. In other systems, the detection mechanism 110 can be incorporated into any other component of the farming machine 100. Depending upon the embodiment, the farming machine 100 may include one or more detection mechanisms 110. For example, the farming machine 100 may include one detection mechanism 110, one detection mechanism 110 per treatment mechanism 120 or per set of treatment mechanisms 120, or one detection mechanism 110 per a particular length (e.g., one foot, one yard, or one meter) along the mounting mechanism 140.

The treatment mechanism 120 functions to apply a treatment to an identified plant 102. The treatment mechanism 120 applies the treatment to the treatment area 122 as the farming machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. A treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, such as in FIGS. 1A-1B, the farming machine 100a includes a single treatment mechanism, wherein the treatment mechanism 120 is actuated or the farming machine 100a moves to align the treatment mechanism 120 active area 122 with the targeted plant 102. In a second variation, the farming machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a third variation shown, such as in FIGS. 1C-1E, the farming machine (i.e., 100b, 100c) includes an array of treatment mechanisms 120, wherein the treatment mechanisms 120 are actuated or the farming machine (i.e., 100b, 100c) is moved to align the treatment mechanism 120 active areas 122 with the targeted plant 102 or plant segment.

The farming machine 100 includes a control system 130 for controlling operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the farming machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 may be a computer, as described in greater detail below in relation to FIG. 7. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 includes a mounting mechanism 140 that functions to provide a mounting point for the system components. In one example, as shown in FIG. 1A-1B, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame, but can alternatively be any other suitable mounting mechanism. In the embodiment of FIGS. 1C-1E, the mounting mechanism 140 extends outward from a body of the farming machine (i.e., 100b, 100c) in the positive and negative x-direction (in the illustrated orientation of FIGS. 1A-1E) such that the mounting mechanism 140 is approximately perpendicular to the direction of travel 115. The mounting mechanism 140 in FIGS. 1C-1E includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the farming machine 100.

The farming machine 100 includes a first set of coaxial wheels and a second set of coaxial wheels, wherein the rotational axis of the second set of wheels is parallel with the rotational axis of the first set of wheels. In the first embodiment, each wheel in each set is arranged along an opposing side of the mounting mechanism 140 such that the rotational axes of the wheels are approximately perpendicular to the mounting mechanism 140. In the second and third embodiments of the farming machine, the rotational axes of the wheels are approximately parallel to the mounting mechanism 140. In alternative embodiments, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but can alternatively be attached to the front of the drive mechanism or to the side of the drive mechanism. Alternatively, the farming machine 100 can include the drive mechanism (e.g., a motor and drive train coupled to the first and/or second set of wheels). In other example systems, the system may have any other means of traversing through the field.

In some configurations, the farming machine 100 additionally includes a verification mechanism 150 that functions to record a measurement of the ambient environment of the farming machine 100. The farming machine may be use the measurement to verify or determine the extent of plant treatment. The verification mechanism 150 records a measurement of the geographic area 104 previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 may additionally include a communication apparatus, which functions to communicate (e.g., send and/or receive) data between the control system 130 and a set of one or more remote devices. The communication apparatus can be a Wi-Fi communication system, a cellular communication system, a short-range communication system (e.g., Bluetooth, NFC, etc.), or any other suitable communication system.

More broadly, the farming machine can take a variety of farming actions based on identified plants. That is, the farming machine need not necessarily treat a plant with a treatment mechanism wen a plant it identified. For example, the farming machine may change its physical configuration when it identifies a plant, e.g., modifying the height of a treatment mechanism, moving a treatment mechanism, changing the position of the mounting mechanism, etc. In another example, the farming machine may change its operational configuration when it identifies a plant, e.g., changing a speed, modifying treatment patterns (treating with different mechanisms), modifying treatment timings (treating sooner or later), etc. Whatever the circumstances, the faming machine can identify plants and take a variety of farming actions to improve its performance in the field.

III. System Configuration

FIG. 2A illustrates a front view of a portion of a farming machine with a pair of image sensors having different fields of view, in accordance with an example embodiment. In FIG. 2A, the first image sensor 210a and the second image sensor 210b are coupled to a superior surface of the mounting mechanism 140. In other embodiments, the image sensors 210 are coupled to a different surface of the mounting mechanism 140 and/or the farming machine 100. Regardless of the attachment surface of an image sensor 210, image sensors 210a and 210b are tilted downwards in order to capture an image of a plant. However, depending upon the embodiment, the tilt may range from perpendicular to the substrate 106 to parallel to the substrate 106. In FIG. 2A, the image sensors 210 are illustrated as immediately adjacent to one another, although in alternative embodiments the image sensors 210 may be spaced apart, e.g., from one to forty inches apart.

In the illustrated example, the first image sensor 210a has a first field of view 230a that overlaps with a second field of view 230b of the second image sensor 210b. The field of view of each image sensor 210 determines the area that the image sensor 210a captures in an image. In the embodiment of FIG. 2A, the image sensors 210a and 210b capture images of plants (e.g., plant 102a, plant 102b) in their respective fields of view. An overlapping field of view 230c illustrates the area seen by both the first image sensor 210a and the second image sensor 210b. Notably, some of the field of view 230a of the first image sensor 210a is not captured by the second image sensor 230b, and some of the field of view 230b captured by the second image sensor 210b is not captured by the first image sensor 210.

The first image sensor 210a and the second image sensor 210b can be different types of image sensors, or may be the same type of image sensor configured differently. The image sensors 210 may be different components or two aspects of the same component, e.g., two different digital cameras, or two lenses of the same digital camera. In an embodiment, the first image sensor 210a produces color images that include a plurality of color pixels and the second image sensor 210b produces infrared images that include a plurality of infrared pixels. For example, the first image sensor 210a may be a digital camera with red, green, and blue pixels. Similarly, the second image sensor 210b may be a digital camera with red, green, and infrared or near-infrared (herein simply "infrared" to refer to either embodiment) pixels. As described in greater detail below, the image sensors 210 may use any of a variety of color filter arrays, such as a Bayer filter design.

In some embodiments, the control system 130 can apply one or more modification functions to images taken by the first image sensor 210a and/or the second image sensor 210b. The modification functions may be used to modify the image such that the field of view represented in the image is modified. For example, the control system 130 may apply a modification function to reduce the size of the image such that the field of view represented in the image is also reduced. In another example, control system 130 may apply one or more modification functions to combine fields of view from one or more images. Some example modification functions include cropping, distortion correction, palletizing (e.g., transforming from 16-bit depth to 8-bit depth), value normalization, white balancing, stereo depth determination, etc., described in greater detail below.

The portion of the farming machine 100 shown in FIG. 2A includes a first treatment mechanism 120a and a second treatment mechanism 120b. The treatment mechanisms 120 are coupled to the mounting mechanism 140 and configured to treat one or more plants 102. The treatment mechanisms 120a and 120b can be the same type of treatment mechanisms or different treatment mechanisms, as described above in relation to FIGS. 1A-1E. In the embodiment shown, the treatment mechanisms 120a and 120b are directed downwards, described in greater detail below, such that each treatment mechanism 120 applies a treatment to a plant substantially below the treatment mechanism 120. In alternative embodiments, the treatment mechanisms 120 can be angled in a direction towards one or more plants (e.g., to treat a plant ahead of or behind the mounting mechanism 140). The treatment mechanisms 120 can be coupled to any surface of the mounting mechanism 140 or they can be retained in a receptacle of the mounting mechanism 140.

The control system 130 uses a plant identification model to identify one or more plants in the images captured by the first image sensor 210a and/or the second image sensor 210b. In some examples, the control system 130 may identify plants in images previously modified (e.g., combined, scaled, etc.) by the control system 130. In response to identifying a plant, the control system 130 actuates an appropriate treatment mechanism (e.g., 120a, 120b) to treat an identified plant based on the location of the plant with respect to the treatment mechanisms 120. In the embodiment of FIG. 2A, the first image sensor 210a corresponds to the first treatment mechanism 120a and the second image sensor 210b corresponds to the second treatment mechanism 120b. As such, the first treatment mechanism 120a treats a plant 102a identified in an image captured by the first image sensor 210a and the second treatment mechanism 120b treats a plant 102b identified in an image captured by the second image sensor 210b. In some examples, either the first treatment mechanism 120a or the second treatment mechanism 120b can treat a plant (e.g., a plant in an overlapping field of view 230c). In other embodiments, a single treatment mechanism 120 is mounted to the mounting mechanism 140 and the treatment mechanism 120 is configured to move along the mounting mechanism 140 to treat plants (e.g., 102a, 102b) identified in an image captured by an image sensor 210.

FIG. 2B illustrates a front view of a portion of a farming machine with a pair of image sensors having wholly overlapping fields of view, in accordance with an example embodiment. In FIG. 2B, the first image sensor 210a and the second image sensor 210b are coupled to a superior surface of the mounting mechanism 140. In other embodiments, the image sensors 210 are coupled to a different surface of the mounting mechanism 140 and/or the farming machine 100. Regardless of the attachment surface of an image sensor 210, image sensors 210a and 210b are tilted downwards in order to capture an image of a plant. However, depending upon the embodiment, the tilt may range from perpendicular to the substrate 106 to parallel to the substrate 106. In FIG. 2A, the image sensors 210 are illustrated as immediately adjacent to one another, although in alternative embodiments the image sensors 210 may be spaced apart, e.g., from one to forty inches apart.

In the embodiment of FIG. 2B, the first image sensor 210a and the second image sensor 210b have completely overlapping fields of view 230d. The field of view 230d of each image sensor 210 determines the area that the image sensor 210a captures in an image. In the embodiment of FIG. 2A, the image sensors 210a and 210b capture images of plants (e.g., plant 102a, plant 102b) in their shared field of view. In such an embodiment, the control system 130 may apply a machine learning model to the images generated by the image sensors 210 to perform a depth-from-mono operation, where stereo depth is estimated for one or more pixels by applying the machine learning model to one or both of the images.

In some embodiments, the control system 130 applies one or more modification functions to images taken by the first image sensor 210a and/or the second image sensor 210b. The control system 130 may use the modification functions to modify the image such that the field of view represented in the image is modified or to make the image more appropriate for subsequent uses, such as plant identification.

The control system 130 can apply other modification functions to an image. For example, the control system 130 can apply a color normalization function such that variations between color in the two images due to lighting effects are removed. For example, the control system 130 may apply the color normalization function to two images such that their color data is normalized. As a specific example, an image captured by a first image sensor may have a first color temperature whereas an image captured by a second image sensor may have a second color temperature. As such, the second image will have different colors than the image having the first color temperature, even if they are images of similar objects. To rectify the two such that their color data can be comparable, the control system 130 applies the color normalization function to the images.

The control system 130 uses a plant identification model to identify one or more plants in the images captured by the first image sensor 210a and the second image sensor 210b, or a combined image generated from the first image sensor 210a and the second image sensor 210b. The control system 130 actuates a corresponding treatment mechanism (e.g., 120a, 120b) in response to an identified plant. Either the first treatment mechanism 120a or the second treatment mechanism 120b can treat a plant in the overlapping field of view 230d. In other embodiments, a single treatment mechanism 120 is mounted to the mounting mechanism 140 and the treatment mechanism 120 is configured to move along the mounting mechanism 140 to treat plants (e.g., 102a, 102b) identified in an image captured by an image sensor 210.

IV. Image Processing and Plant Identification

To improve the plant identification process, the control system 130 applies one or more modification functions to an image captured by an image sensor 210 in order to more accurately identify a plant for treatment. The modification functions can include cropping, keystoning, scaling, shifting, stabilizing, debayering, white balancing, resizing, exposure control, and value normalization. In some embodiments, the modification functions are exclusive to or emphasized for bands of light that are common to both the color images and the infrared images, e.g., green bands of light. This improves the utility of the images for determining stereo depth, as described below.

In some examples, the control system 130 applies one or more modification functions based on geometric and/or operating parameters of the farming machine 100, described below in relation to FIGS. 3A-3D. In particular, the control system 130 can apply one or more modification functions to determine stereo depth based on overlapping fields of view and combine stereo depth information with color channels from both image sensors 210.

Figure 3A:
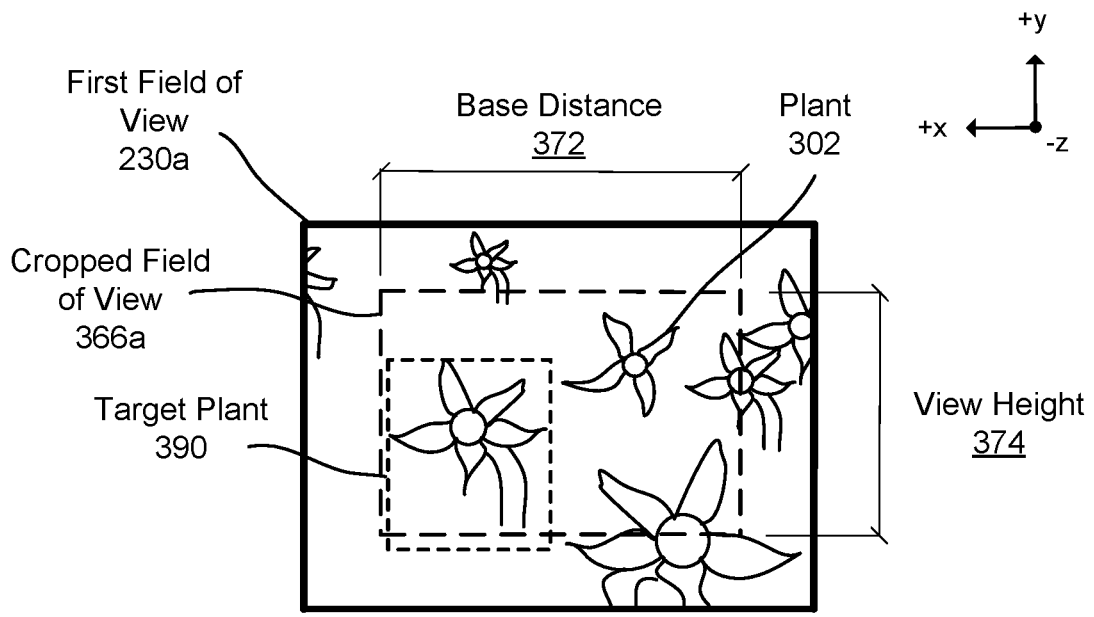
FIG. 3A illustrates a field of view from the perspective of a first image sensor, in accordance with an example embodiment.

FIG. 3A illustrates a field of view from the perspective of a first image sensor, in accordance with an example embodiment. The control system 130 captures an image using the image sensor 210a of the first field of view 230. The captured image includes several plants, including a target plant 390. The control system 130 applies one or more modification functions to the image based on geometric and/or operating parameters of the farming machine 100. In one example, the control system 130 crops the image to generate an image with a cropped field of view 366a with a base distance 372a and a view height 374. The control system 130 crops the image to improve the plant identification process (e.g., reducing time taken to identify a plant). Additionally, the control system 130 can crop the image to remove regions that are less suitable to plant identification. For example, image edges and/or corners may be more subject to warping, discoloration, etc. which can lead to misidentification of plants. The control system 130 can also crop the first field of view 230a based on additional geometric parameters, properties of the image sensor 210a (e.g., processing speed, size, etc.), and/or operating parameters of the farming machine 100.

The control system 130 identifies one or more plants in the cropped field of view 366a of the captured image. For example, the control system 130 identifies plant 302 based on the cropped field of view 366a, and also target plant 390. As described below, the control system 130 uses the pixels corresponding to the target plant 390 to generate a stereo image of the target plant 390.

Figure 3B:
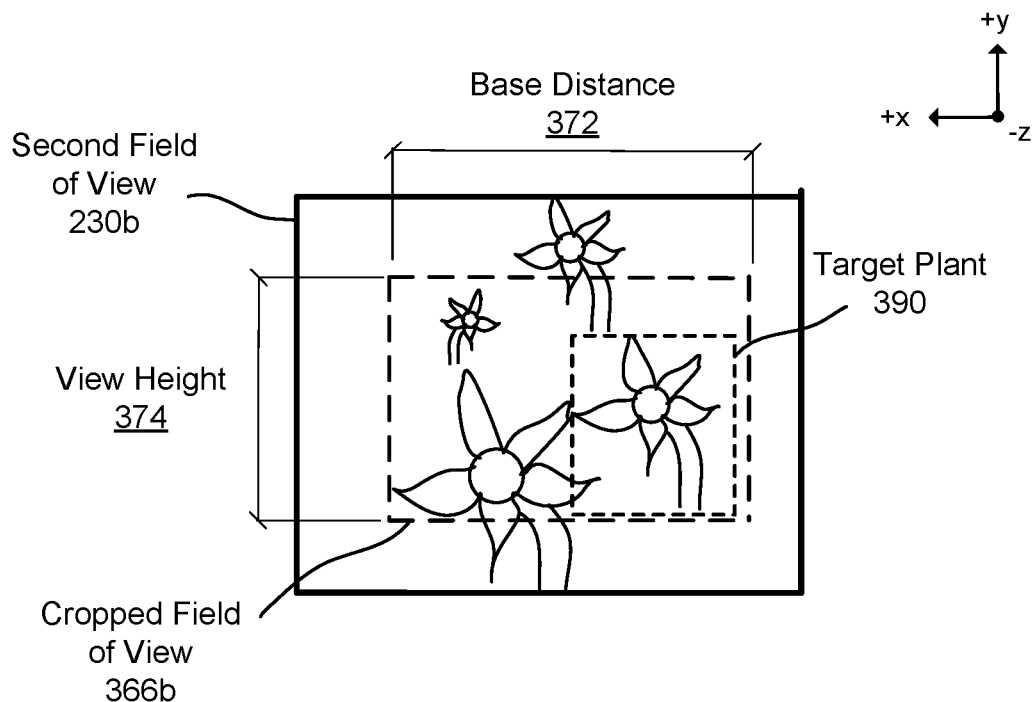
FIG. 3B illustrates a field of view from the perspective of a second image sensor, in accordance with an example embodiment.

FIG. 3B illustrates a field of view from the perspective of a second image sensor, in accordance with an example embodiment. The control system 130 captures an image using the image sensor 210b of the second field of view 230b. The captured image includes several plants, including the target plant 390. Similar to the process described in relation to FIG. 3A, the control system 130 applies one or more modification functions to the image based on geometric and/or operating parameters of the farming machine 100. For example, the control system 130 can apply a cropping function to generate the cropped field of view 366b. In one embodiment, the control system 130 captures an image of the first field of view 230a and the second field of view 230b at the same time. As such, the control system 130 can generate an aggregate image of a region of the geographic area 104 based on the first field of view 230a and the second field of view 230b, or use an overlapping region for stereo depth determination and plant identification.

Figure 3C:
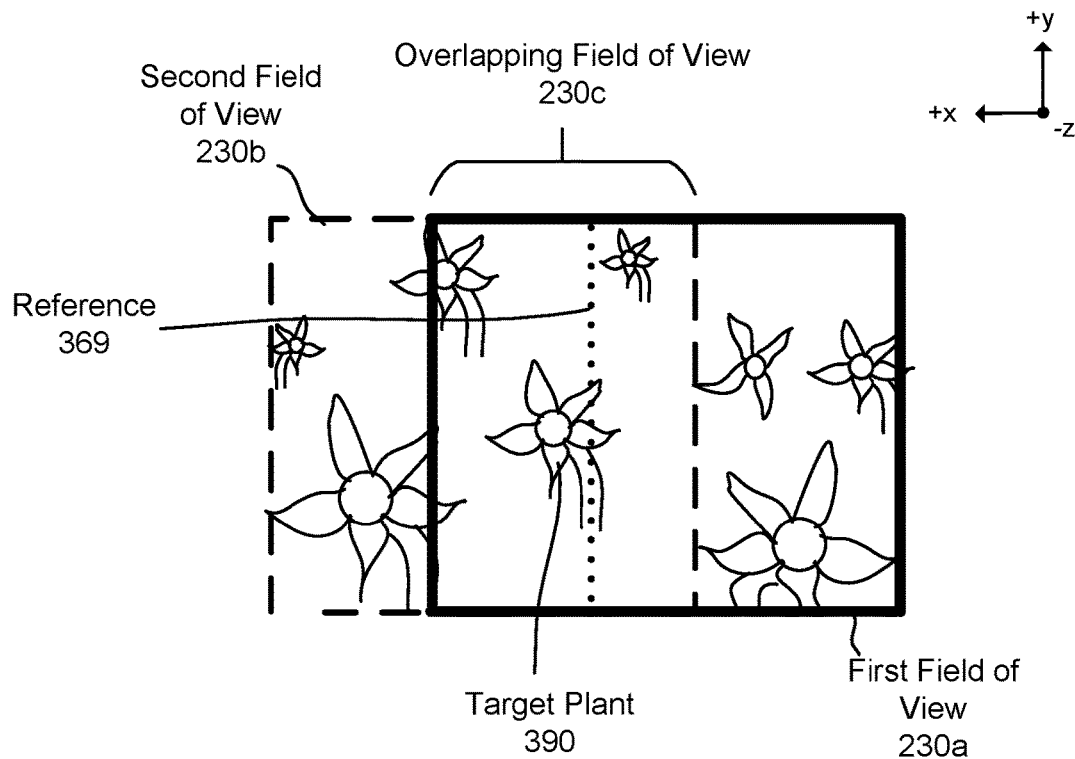
FIG. 3C illustrates the field of view of FIG. 3A and an adjacent field of view of FIG. 3B, in accordance with an example embodiment.

FIG. 3C illustrates the field of view of FIG. 3A and an adjacent field of view of FIG. 3B, in accordance with an example embodiment. As described above, the first image sensor 210a has an overlapping field of view 230c with second image sensor 210b. FIG. 3C illustrates the field of view of the adjacent image sensors 210a and 210b from the perspective of the image sensors. The first field of view 230a of the first image sensor 210a shown in FIG. 3A is illustrated by the solid line in FIG. 3C. The first field of view 230a overlaps with the second field of view 230b of the second image sensor 210b shown in FIG. 3B. Images created with the image sensors 210 will likewise have an overlapping region, where pixels of each image represent the same overlapping field of view 230c. These overlapping pixels can be used for stereo depth determination to generate a depth map encoding depth information for each pixel in the overlapping region. That is, the depth map comprises an array of depth pixels representing stereo depth information of pixels in the overlapping region. The depth map can be used to enhance plant identification, as described below.

Figure 3D:
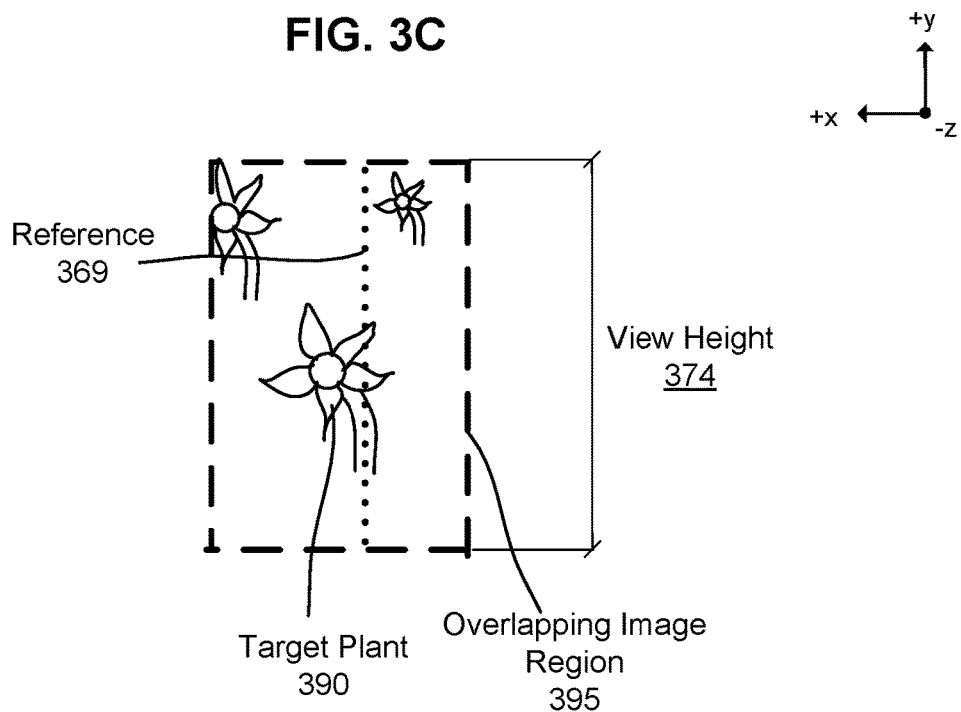
FIG. 3D illustrates an overlapping image region based on FIG. 3C, in accordance with an example embodiment.

FIG. 3D illustrates an overlapping image region based on FIG. 3C, in accordance with an example embodiment. The overlapping image region 395 is generated by the control system 130 based on the reference 369. As shown in FIG. 3D, the control system 130 aligns the stereo image pair generated with the image sensors 210 to determine the overlapping image region 395. The control system 130 crops the view height 374 based on geometric parameters and/or operating parameters of the farming machine 100. In other embodiments, the control system 130 crops the view height 374 based on a reference, in a similar manner to the previously described reference 369. The control system 130 crops the images captured by the image sensors 210 to improve time taken to identify a plant in the image and allow the control system 130 to individually identify and treat plants throughout the geographic area 104. In the example shown in FIGS. 3A-3D, the control system 130 is able to employ a plant identification model to identify the target plant 390 in the overlapping image region 395 in a short time window. Additionally, cropping the images accounts for vibration and/or movement of the mounting mechanism 140, and effectively the image sensors 210, as the farming machine 100 travels through the field. Cropping the images also increases the ratio of pixels for which stereo depth information can be determined. The stereo image pair includes, for the overlapping image region 395, data from both the color image and multispectral image, which can be used for stereo depth determination.

In an embodiment, the control system 130 uses the color image to add an artificial blue channel to the multispectral image. This can be useful for plant identification, or for displaying the multispectral image to a user such that it appears to be in true color.

After applying zero or more modification functions, the control system 130 employs a plant identification model to identify a plant, a plant type, plant features, etc. An example of a plant identification model employed by the control system 130 is described in U.S. patent application Ser. No. 16/126,842 titled "Semantic Segmentation to Identify and Treat Plants in a Field and Verify the Plant Treatments," filed on Sep. 10, 2018, but other plant identification models are also possible. In one example, the control system 130 employs a plant identification model to identify the target plant 490. Identifying a plant can include determining the type of plant and/or the location of the plant.

The control system 130 can also evaluate an identified plant to determine additional plant properties or adjust settings of an image sensor 210. The control system 130 can evaluate characteristics including, for example, Normalized Difference Vegetation Index (NDVI), Transformed Chlorophyll Absorption in Reflectance Index normalized by Optimized Soil-Adjusted Vegetation Index (TCARI/OSAVI), Normalized Difference Red Edge Index (NDRE), Canopy Chlorophyll Content Index (CCCI), Photochemical Reflectance Index (PRI), etc. These characteristics are each determined by the control system 130 using color data from at least one of the first image sensor and the second image sensor, e.g., red color data from a first image sensor and infrared color data from a second image sensor. Additionally, the control system 130 can evaluate plant properties to determine if the plant is healthy and/or if the plant needs treatment. Responsive to identifying a plant in an image, the control system 130 actuates a corresponding treatment mechanism 120 to treat the identified plant. In alternative embodiments, the control system 130 could detect properties of the soil, or detect plant residue, using the image. This could be used, for example, to optimize the amount of herbicide used, or the amount of fertilizer.

Additional image processing performed by the control system 130 includes integrating data from color images and infrared images from paired color image sensors and infrared image sensors, e.g., first image sensor 210a and second image sensor 210b. As described in further detail below, the color image sensor produces red, green, and blue pixels, and the infrared image sensor produces red, green, and infrared pixels. In other words, the color image sensor produces red, green, and blue color data for a first field of view, and the infrared image sensor produces red, green, and infrared color data for a second field of view. The farming machine 100 therefore cumulatively collects, for an overlapping region of the first and second fields of view, using the color image sensor and the infrared image sensor, red, green, blue, and infrared color data.

The control system 130 generates a stereo image pair cropped to the area of the overlapping region or a portion of the area of the overlapping region. The stereo image pair includes depth information for the overlapping region or portion of the area of the overlapping region. Using pixels from each image generated by a pair of image sensors 210, the control system 130 can generate a disparity map by matching points from a particular light spectrum in one image (e.g., a subset of light bands common to both images, such as red or green) to points from the same light spectrum in the other image. The control system 130 uses the disparity map in conjunction with stored information regarding the extrinsic calibration of the image sensors 210 (e.g., the physical separation between the image sensors 210) to generate a depth map recording depth information for the overlapping region or portion of the area of the overlapping region. Stereo pixels can be generated using the depth map and may be encoded into one or both of the images of the stereo image pair.

The control system 130 can generate the depth map using any of a variety of techniques using heterogenous multi-spectral images. As described herein, the heterogenous multi-spectral images may be a first image with red, green, and blue pixels, and a second image with red, green, and infrared pixels, but in alternative embodiments alternative images, generated with alternative image sensors 210, may be used. Regardless of the particular bands of light of the image sensors 210, the control system 130 can use a subset of light bands common to the images produced by the image sensors 210, in conjunction with information of the extrinsic calibration of the image sensors 210, to determine stereo depth information. For example, red bands, green bands, or a grey-scale bands derived from the red and green bands could all be used depending upon the embodiment.

The control system 130 may utilize stereo depth data to identify plants for treatment in the field. In some embodiments, the control system 130 applies a clustering algorithm to the depth information to identify groups of pixels with similar depth information. The control system 130 determines the grouped pixels are a plant if they are above or below a threshold depth, or are more than a threshold distance above or below an expected depth, and labels the pixels as a plant. Alternatively, the control system 130 may apply a classification model to a depth map to identify a plant in the depth map. For example, the control system 130 may employ a Naïve Bayes, a k-Nearest Neighbors, a Random Forest, an encoder/decoder, etc. algorithm to depth information (e.g., the depth map) to identify plants. In an embodiment, the control system 130 may apply one or more statistical analyses to depth information to identify plants. For example, the control system 130 may apply a maximum likelihood estimation to the depth information and label pixels having a probability above a threshold probability as a plant. The control system 130 labels pixels identified as representing a plant with a plant label. Other methods of identifying plants based on depth information are also possible.

The control system 130 may also classify pixels with more robust labels using any of the techniques described herein. For example, the control system 130 may classify one group of pixels representing a plant as a crop, and another group of pixels representing a plant as a weed, and treat each group individually. The control system 130 may also label pixels as a substrate (e.g., ground, grass, dirt, etc.), an obstruction (e.g., rocks, field debris, etc.), etc. For example, the control system 130 may generate a first plant label for some of the plants, a second plant label for other plants, and a substrate label for a substrate. As a particular example, the control system 130 may discriminate dandelions from tomato plants based on depth information, as dandelions are shorter than grown tomato plants. As such, the control system 130 identifies plants closer than a threshold depth to the image acquisition system (e.g., those with less depth) as tomato plants and plants further than the threshold depth from the image acquisition system (e.g., those with greater depth) as dandelions. In an embodiment, the control system 130 modifies depth information based on stored information regarding image sensor 210 tilt, i.e., an angle of the image sensor 210 relative to the ground. By factoring for the tilt of the image sensor 210, the control system 130 can generate more accurate heights for plants.

In an embodiment, the control system 130 estimates the depth of the ground relative to the image sensors 210, and also the height of the crop's canopy relative to the ground. The canopy is the average crop height, e.g., the average height of crop-labeled pixels relative to the ground depth. The control system 130 identifies areas with canopy heights outside a threshold distance from the canopy, which are subsequently treated with an herbicide.

In an embodiment, the depth information can be used in conjunction with visual information, e.g., red, green, blue, and infrared pixels of the stereo image pair, and in some embodiments other depth information sources, such as LiDAR (3-dimensional laser scanning) or ultrasound, to enhance plant identification.

By including five categories of information (red, green, blue, infrared, and stereo depth) for the stereo image pair, the control system 130 can more accurately identify plants for treatment in the field than extant techniques that use fewer categories of information (e.g., only red, green, and infrared color data). For example, a machine learning model (e.g., an artificial neural network) trained on images with pixels including red, green, blue, infrared, and stereo depth information may produce more accurate plant identification estimates than machine learning models trained on images with pixels including fewer data points. The machine learning model may also factor for characteristics including those described above, e.g., NDVI.

In an embodiment, the control system 130 uses the stereo image pair and depth map to perform label transfer. The control system 130 uses a plant identification model on one of the images to label features of the image, then uses the depth map to map the features to the other image of the stereo image pair. In alternative embodiments, the control system 130 uses a plant identification model on each image of the stereo image pair, then cross-validates the resultant labels, where shared labels are assigned greater confidence and/or labels not shared by both images are assigned lesser confidence.

V. Image Structure

Figures 4A, 4B:
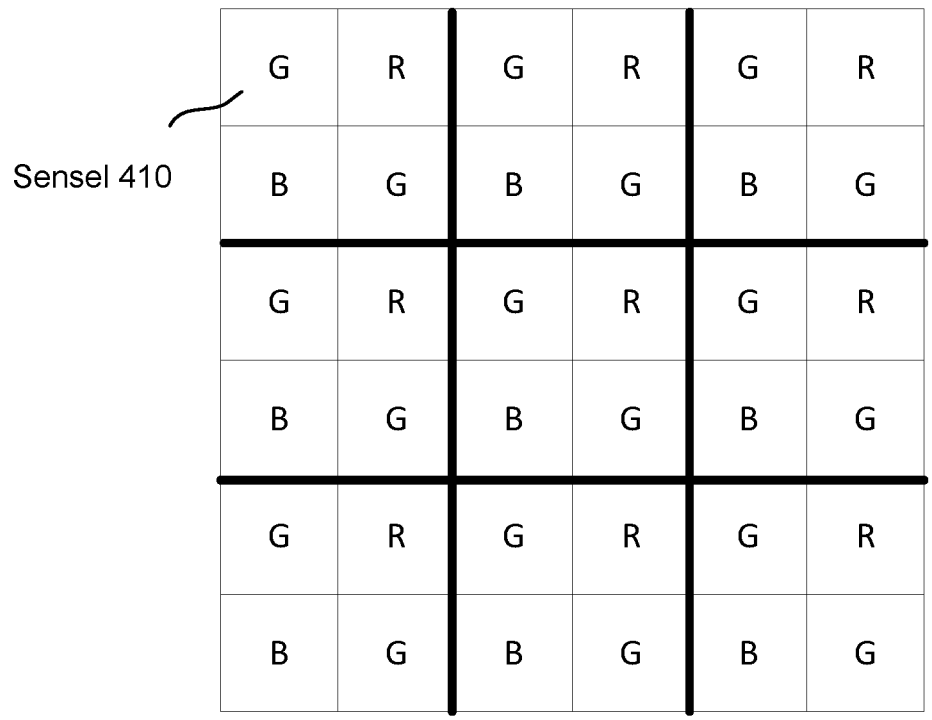
FIG. 4A illustrates a pixel array of a color image sensor, in accordance with an example embodiment.
FIG. 4B illustrates a pixel array of a near-infrared image sensor, in accordance with an example embodiment.

FIG. 4A illustrates a pixel array of a color image sensor, in accordance with an example embodiment. In the embodiment of FIG. 4A, the pixel array is three pixels by three pixels in area, where each pixel includes four sensels 410 (i.e., a photodetector, a photosensor, etc.) 410, labeled either "G," "R," or "B" in a Bayer filter mosaic. In alternative embodiments the pixel array may include any number of pixels and each pixel may have any number of sensels 410. Additionally, the pixel array may not have one-to-one correspondence of sensels 410 to pixels, but rather use sliding window techniques or the like to use individual sensel 410 information as input for multiple pixels. Furthermore, the pixel array may employ alternative sensel 410 mosaics or alternative color separation mechanisms in alternative embodiments, such as a three charge-coupled device where color separation is done using a dichroic prism. In some embodiments, an image sensor in the image acquisition system has one or more full color sensors with color filters for particular bandwidths of light. In such embodiments the sensels are color filters, rather than sensors for particular colors.

A sensel 410 labeled "G" represents a green light-reactive sensel, a sensel 410 labeled "R" represents a red light-reactive sensel, and a sensel 410 labeled "B" represents a blue light-reactive sensel. Sensels 410, e.g., photodetectors or photosensors, are sensors that are light-reactive. In one embodiment, the sensels 410 may be light-reactive to particular wavelengths, such as green, blue, or red as mentioned. In another embodiment, the sensels 410 are all uniform light-reactive sensors with different overlaid light filters depending upon a respective color to be sensed. For example, an infrared sensel 410 may be a uniform light-reactive sensor similar to a green sensel 410, except the infrared sensel 410 is overlaid by a light filter that filters all light except infrared light, and the green sensel 410 is overlaid by a light filter that filters all light except green light.

Upon receipt of light of a corresponding wavelength, a p-n junction in the sensel 410 converts the received photons into electric current, which indicates to the image sensor receipt of light of that color. The color image sensor combines data from several sensels to produce a "full-color" pixel, where the color of the pixel is based on the component colors detected at the sensels comprising the pixel. Full-color pixel arrays can be useful for plant detection, and also for human use, e.g., for delivery to a screen of the farming machine for display.

FIG. 4B illustrates a pixel array of a near-infrared image sensor, in accordance with an example embodiment. The pixel array of the near-infrared image sensor is similar to that of the color image sensor in FIG. 4A, except that it includes "N" sensels rather than "B" sensels. Sensels labeled "N" represent infrared sensels, i.e., sensels reactive to infrared light wavelengths. As such, rather than producing full-color pixels from the visible light range, the pixel array of the near-infrared image sensor produces pixel arrays including infrared data but missing the blue color data. Infrared data can be especially useful for plant detection, as many plants significantly reflect infrared light, relative to reflected red light, due to the performance of photosynthesis.

VI. Estimating Color Channels

In some circumstances, the colors in a stereo image pair may not be an accurate representation of the actual color of the objects represented in the image. For example, the stereo image pair may include a first image with red, green, and blue channels, and a second image with red, green, and infrared channels. Accordingly, the blue color information in the latter image may be inaccurate. Consider, for example, a multispectral image with red, green, and infrared pixels. The multispectral image does not have blue pixels, and therefore no blue channel.

In such cases, the control system 130 may estimate a blue color information for multispectral images obtained by the image acquisition system. That is, the control system 130 may estimate a blue channel for an image obtained by an image sensor that collects red, green, and infrared data. In an embodiment, the control system estimates a blue channel by applying a machine learning algorithm configured to generate blue color information for a multispectral image based on the corresponding color image in the stereo image pair. In an example, as described below, the machine learning algorithm may be implemented as an artificial neural network. Alternatively or additionally, the control system 130 may perform color matching or histogram matching to fill in the blue channel for the multispectral image, or may use machine learning, such as a neural network, to perform the color matching or histogram matching. This neural network is trained on stereo image pairs and outputs a blue channel for the multispectral image.

To illustrate, for example, the control system 130 may access a multispectral image including red, green, and infrared color information. The control system 130 inputs the multispectral image into an input layer of a neural network configured to generate blue color information for the multispectral image. The control system 130 applies the various functions to the multispectral image to modify and migrate the data of the multispectral image through the neural network. The neural network outputs an image including red, green, infrared, and blue color channels in the output layer of the artificial neural network ("augmented multispectral image"). The blue color channel is artificially generated by the functions of the artificial neural network. At this point, the control system can generate a stereo image pair using the augmented multispectral image and an image obtained from a standard color image sensor. The stereo image pair generated from the augmented multispectral image may have a more accurate representation of blue color information than a stereo image pair generated from a non-augmented multispectral image.

Figure 5:
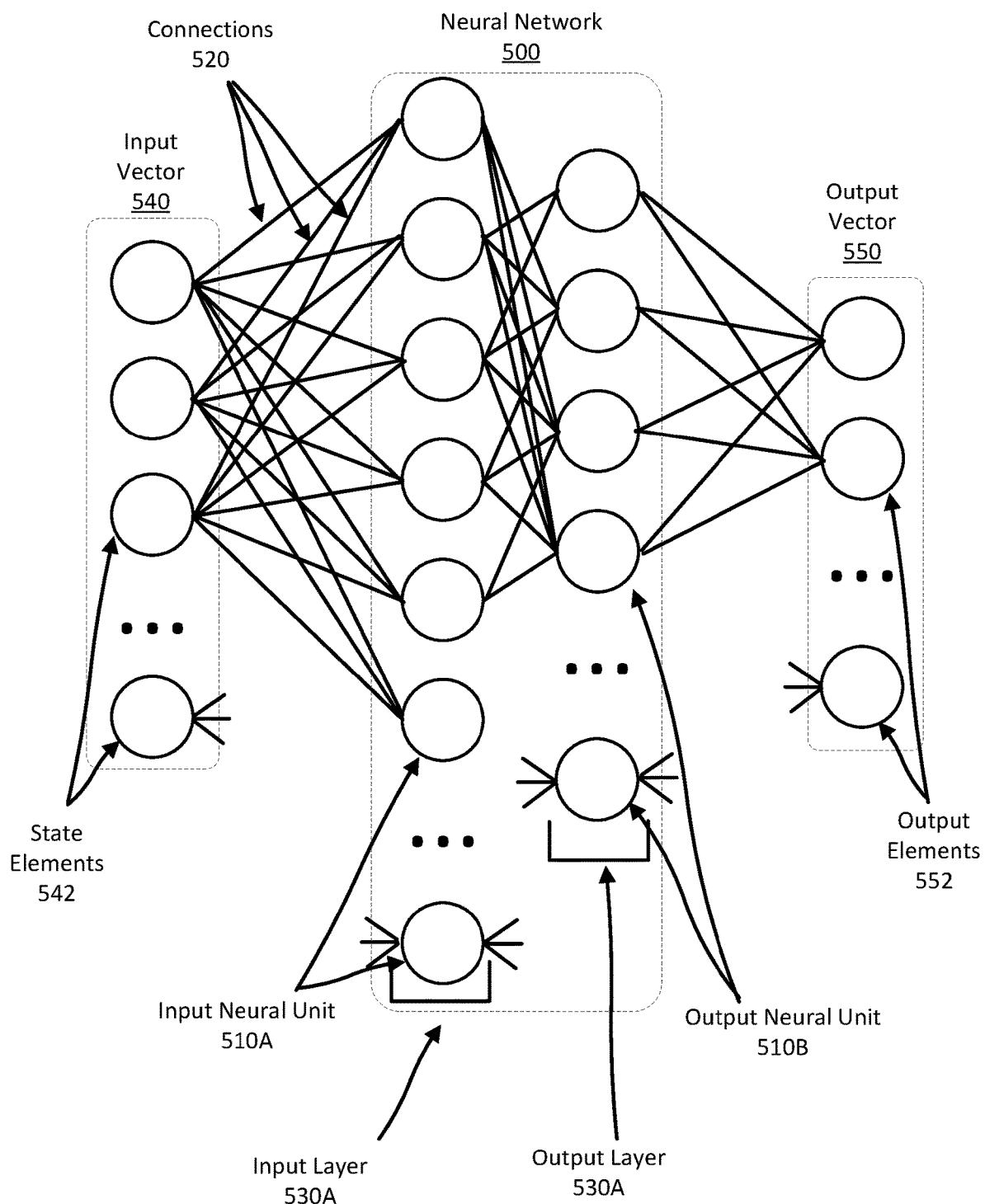
FIG. 5 illustrates a neural network, in accordance with an example embodiment.

FIG. 5 illustrates an artificial neural network (ANN), in accordance with an example embodiment. The ANN 500 is configured to generate a blue color channel for an infrared image. The ANN 500 is based on a large collection of simple neural units 510. A neural unit 510 can be any of the color information represented in an image. Each neural unit 510 is connected with many others, and connections 520 can enhance or inhibit adjoining neural units. Each individual neural unit 510 can compute using a summation function based on all of the incoming connections 520. There may be a threshold function or limiting function on each connection 520 and on each neural unit itself 510, such that the neural units signal must surpass the limit before propagating to other neurons. These systems are self-learning and trained, rather than explicitly programmed. The training process is described in greater detail below.

The neural network of FIG. 5 includes two layers 530: an input layer 530A and an output layer 530B. The input layer 530A has input neural units 510A which send data via connections 520 to the output neural units 510B of the output layer 530B. In other configurations, an ANN can include additional hidden layers between the input layer 530A and the output layer 530B. The hidden layers can have neural units 510 connected to the input layer 510A, the output layer 510B, or other hidden layers depending on the configuration of the ANN. Each layer can have any number of neural units 510 and can be connected to any number of neural units 510 in an adjacent layer 530. The connections 520 between neural layers can represent and store parameters, herein referred to as weights, that affect the selection and propagation of data from a particular layer's neural units 510 to an adjacent layer's neural units 510. Backpropagation trains the various connections 520 and weights such that the output of the ANN 500 generated from the input to the ANN 500 improves farming machine 100 performance, for example, by properly filling in the blue channel in a first image of a stereo image pair to match the data from the other image of the stereo image pair, e.g., properly filling in the blue channel in an infrared, red, and green image. Another implementation of the ANN 500 is plant identification, as described throughout the detailed disclosure.

Finally, each neural unit 510 can be governed by an activation function that converts a neural units weighted input to its output activation (i.e., activating a neural unit in a given layer). Some example activation functions that can be used are: the softmax, identity, binary step, logistic, tan h, arctan, softsign, rectified linear unit (ReLU), or any other activation function for neural networks. Mathematically, an ANN's function is defined as a composition of other sub-functions, which can further be defined as a composition of other sub-sub-functions. The ANN's function is a representation of the structure of interconnecting neural units and that function can generate artificial color channels for an input infrared image.

Most generally, the ANN 500 can use the input neural units 510A and generate an output via the output neural units 510B. In some configurations, input neural units 510A of the input layer can be connected to an input vector 540 (e.g., an infrared image). The input vector 540 can include any information included in the infrared image including, for example, red, green, and infrared color information, time the image was taken, lighting conditions, etc. (e.g., state elements 542). Each state element 542 of the input state vector 540 can be connected to any number of input neural units 510A. The input state vector 540 can be connected to the input neural units 510A such that ANN 500 can generate an output at the output neural units 510B in the output layer 530A. The output neural units 510B can represent any generated information from the ANN including red, green, blue, and infrared color information. In some configurations, the output neural units 510B can be connected to any number of elements output elements 552 of an output vector 550. Here, the output vector 550 is an augmented infrared image including red, green, blue, and infrared color information. The control system 130 may utilize the augmented infrared image to generate stereo images.

The ANN 500 can be trained in a variety of manners. In an example, the ANN is trained (e.g., using control system 130, or some other processing system) to generate a blue color channel for an infrared image using numerous training images. Training images include infrared images of a field of view ("unlabeled image") and a standard color image of the corresponding field of view ("labelled image"). Training images may also include images taken with a multispectral camera that captures more colors than an image sensor 210 of the farming machine, e.g., images including all light bands captured cumulatively by the first image sensor 210A and the second image sensor 210B, e.g., red, green, blue, and infrared bands of light. The functions of the ANN 500 are trained to identify latent information in the unlabeled image corresponding to the information in the labeled image. For example, the functions of ANN 500 are configured to identify latent information in an unlabeled image representing blue color information in a labelled image. In this manner, the functions of the ANN 500 can generate "expected" blue color information for an infrared image based on the numerous labelled images used to train the ANN 500. Other methods of training the ANN 500 are also possible.

VII. Method

Figure 6:
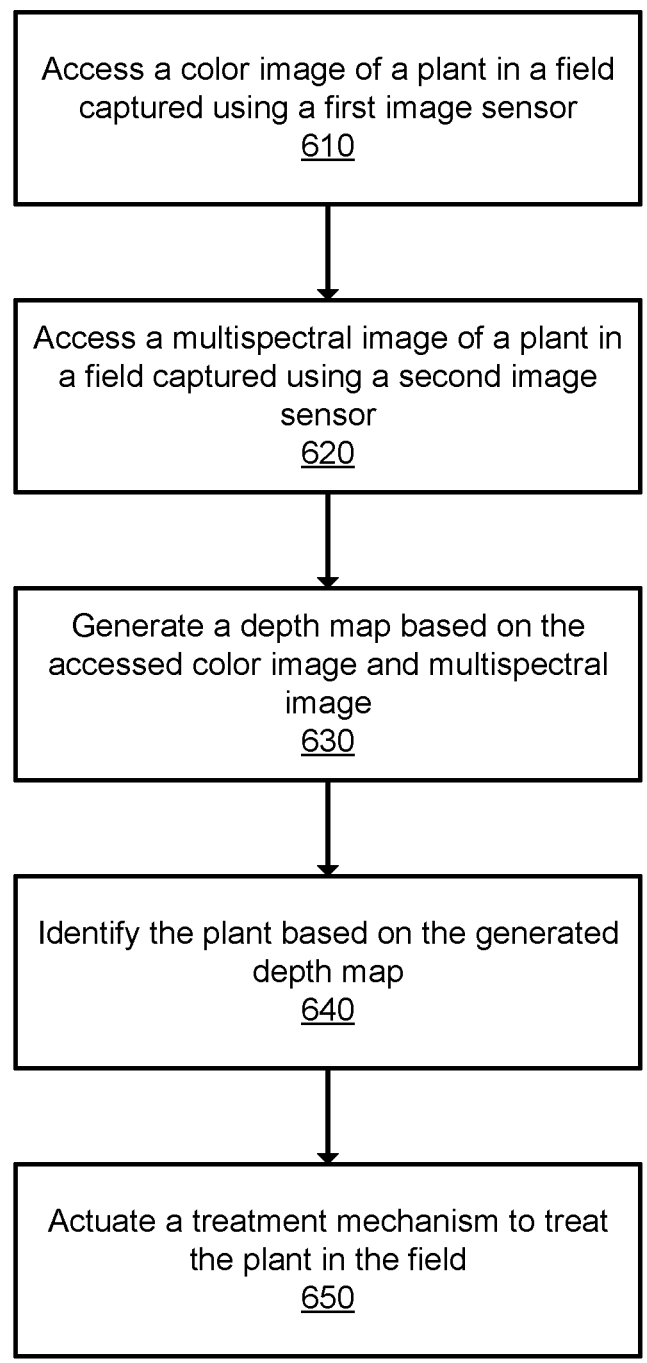
FIG. 6 is a flow chart illustrating a method of identifying and treating a plant using a farming machine with an image acquisition system having a pair of image sensors, in accordance with an example embodiment.

FIG. 6 is a flow chart illustrating a method of identifying and treating a plant using a farming machine with an image acquisition system having a pair of image sensors, in accordance with an example embodiment. The steps of FIG. 6 are illustrated from the perspective of a system (e.g., control system 130) with a hardware processor for performing the method 600. However, some or all of the steps may be performed by other systems or components. In addition, in some embodiments, the steps may be performed in parallel, in different orders, or asynchronously, and in other embodiments, different steps altogether may be performed.

A farming machine includes an image acquisition system having a pair of image sensors coupled to a mounting mechanism to identify a plant for treatment as the farming machine moves through a field. The pair of image sensors is a first image sensor configured to produce color images and a second image sensor configured to produce multispectral images. Traditionally, the farming machine uses data from like image sensors to identify plants in the field. However, here, the farming machine uses the pair of different image sensors (reactive to different wavelengths of light) to identify plants in the field, which, in combination with one or more modification functions, provides for higher plant identification accuracy.

The control system 130 accesses 610 a color image of a plant in a field, and additionally accesses 620 a multispectral image of the plant in the field. In an embodiment, the color image is captured by the first image sensor and the multispectral image is captured by the second image sensor, together making a stereo image pair. The color image has pixels representing a first group of wavelengths (e.g., red, green, and blue), and the multispectral image has pixels representing a second group of wavelengths (e.g., red, green, infrared). Typically, there is at least one similar wavelength between the first image and the second image (e.g., red and green). The control system 130 generates 630 a depth map based on the accessed stereo image pair.

In an embodiment, the control system generates 630 the depth map for an overlap between a first field of view of the color image and a second field of view of the infrared image. The depth map includes stereo depth information for pixels in the overlapping field of view. To do so, the control system access pixels representing similar wavelength in the overlapping region (e.g., the green pixels from both color image and the multispectral image). The control system then determines stereo depth information by comparing pixels representing a similar wavelength to determine stereo depth information. The determined stereo depth information is encoded into pixels of the depth map.

Generating 630 the depth map can include the application of one or more modification functions to the color and/or multispectral images. The modification functions modify one or more characteristics of an image to improve image processing and plant identification. In some circumstances, the control system 130 applies modification functions to determine, or assist in determining, depth information for the pixels of the overlapping region. Modification functions may include many functions, such as, for example, keystoning, scaling, shifting, stabilizing, debayering, cropping, white balancing, resizing, exposure control, value normalization, and stereo depth determination.

The control system 130 identifies 640 the plant based on the generated 630 depth map. In an embodiment, the control system 130 applies a plant identification model to the generated 630 depth map and/or one or more images of the stereo image pair to identify 640 the plant. For example, referring to FIG. 3D, the control system identifies the target plant 390 as a weed. Returning to FIG. 6, responsive to identifying the plant, the control system 130 actuates 650 a treatment mechanism to treat the identified plant in the field. The treatment mechanism applies a treatment to the identified plant. In the example of the weed identified in FIG. 3D, the farming machine 100 applies a treatment mechanism to kill the target plant 390. Thus, the farming machine targets and treats plants individually, improving farming efficiency and cost.

VIII. Control System

Figure 7:
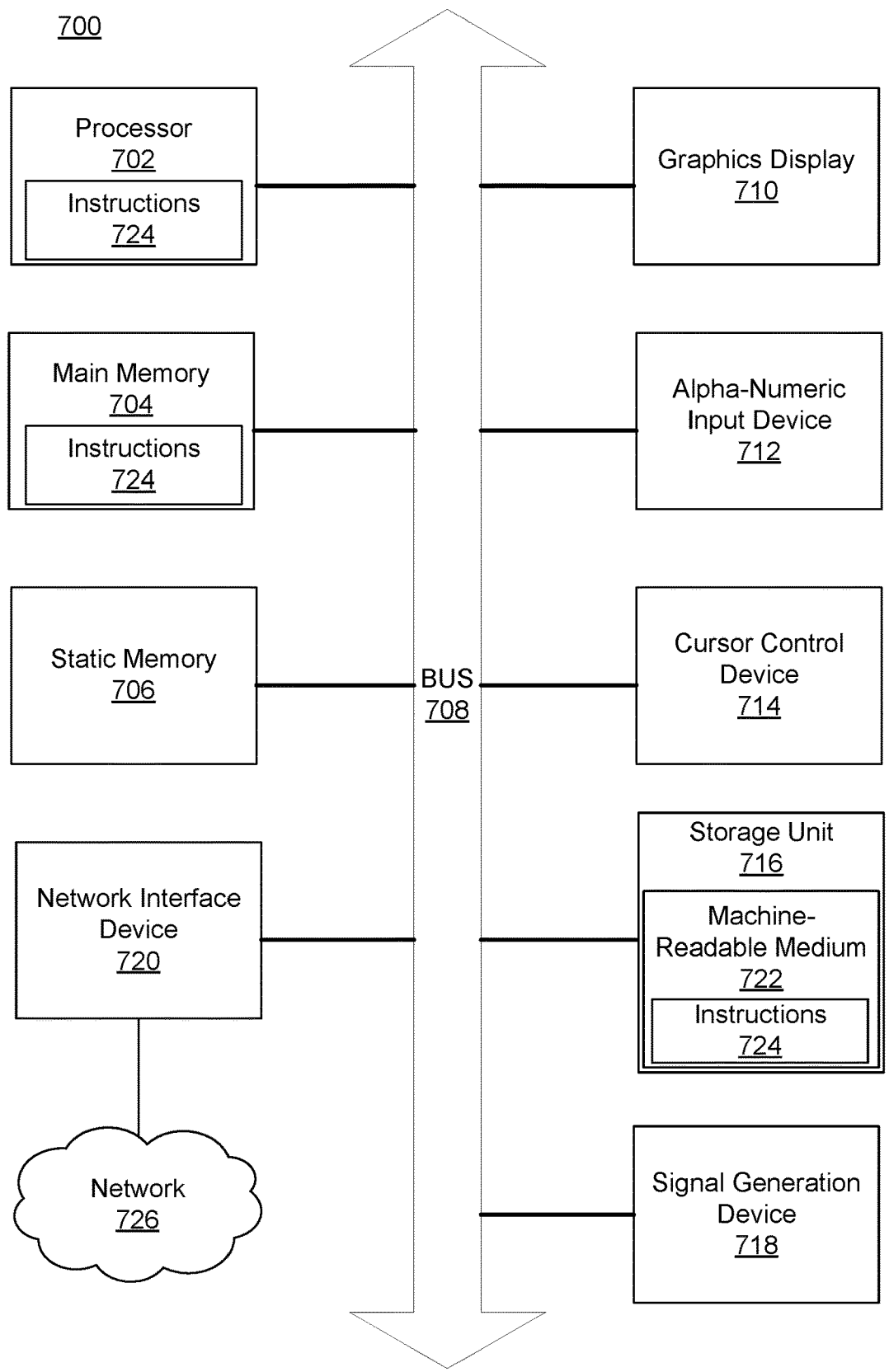
FIG. 7 illustrates computing hardware components of a farming machine, in accordance with an example embodiment.

FIG. 7 is a block diagram illustrating components of an example machine for reading and executing instructions from a machine-readable medium. Specifically, FIG. 7 shows a diagrammatic representation of control system 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include the functionalities of modules of the system 130 described in FIG. 2. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

The control system 130 can comprise a processing unit (e.g., one or more of a CPU, a GPU, or an FPGA) and a data storage medium (e.g., static or dynamic memory). In one embodiment, the control system 130 comprises a deep-learning GPU that is configured to effectively execute a deep-learning neural network. For example, the computer system 700 may include an NVIDIA GeForce® GTX™ TITAN X using the Caffe deep learning framework or the NVIDIA Jetson Xavier using the Tensorflow deep learning framework. Furthermore, image data passed in to the computer instructions may be transmitted to the control system 130 for processing using any type of transmission protocol. For example, the open systems interconnect (OSI) model may be used to send image data from an image sensor 210 to the control system 130 using ethernet connections between these components.

VII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a farming machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for taking a farming action in a field, comprising:
    accessing a color image corresponding to a first field of view and comprising a plurality of color pixels comprising (i) one or more color pixels representing a plant in the field, and (ii) one or more color pixels for a particular spectral band;
    accessing a multispectral image corresponding to a second field of view and comprising a plurality of multispectral pixels comprising (i) one or more multispectral pixels representing the plant in the field, and (ii) one or more multispectral pixels for the particular spectral band;
    generating a depth map comprising a plurality of depth pixels representing stereo depth information, the plurality of depth pixels including one or more depth pixels representing the plant in the field, by:
        identifying an overlapping region between the first field of view and the second field of view;
        generating stereo depth information from the one or more multispectral pixels and the one or more color pixels for the particular spectral band that correspond to the overlapping region; and
        encoding the stereo depth information into the plurality of depth pixels of the depth map;
    identifying the plant in the plurality of depth pixels of the depth map; and
    taking a farming action in the field based on the identified plant in the plurality of depth pixels of the depth map.

2. The method of claim 1, wherein a first image sensor is a digital camera with red, green, and blue color channels, and the plurality of color pixels include red, green, and blue color pixels.

3. The method of claim 1, wherein a second image sensor is a digital camera with red, green, and near-multispectral color channels, and the plurality of multispectral pixels include, red, green, and near-multispectral color pixels.

4. The method of claim 1, wherein identifying the plant further comprises applying a plant identification model to at least one of the accessed color image, the accessed multispectral image, and the depth map.

5. The method of claim 1, wherein the first field of view and the second field of view at least partially overlap on a plane of the field.

6. The method of claim 1, wherein identifying the plant further comprises:
determining at least one of a normalized difference vegetation index calculation and an enhanced vegetation index calculation using the multispectral image; and
identifying the plant based on the at least one of the determined normalized difference vegetation index calculation and the determined enhanced vegetation index calculation.

7. The method of claim 1, wherein the particular spectral band is red or green.

8. The method of claim 1, wherein generating depth pixels comprises:
estimating a first set of blue pixels for the multispectral image; and
combining the first set of blue pixels with a second set of blue pixels from the color image.

9. The method of claim 8, wherein estimating the first set of blue pixels for the multispectral image comprises:
inputting the multispectral image into a machine learned neural network, the machine learned neural network configured to estimate the first set of blue pixels for the multispectral image based on the color image and the multispectral image;
wherein the machine learned neural network is trained using overlapping regions of a plurality of previously accessed color images and multispectral images.

10. The method of claim 1, wherein the overlapping region is determined based on at least one of (i) a hardware configuration of an image acquisition system performing the farming action, (ii) a configuration of a farming machine performing the farming action, and (iii) one or more image processing techniques comprising area-based image registration and feature-based image registration.

11. The method of claim 1, wherein identifying the plant further comprises:
identifying one or more depth pixels of the plurality of depth pixels having depth information a threshold distance from an indicative depth, the identified one or more depth pixels comprising pixels representing the plant.

12. The method of claim 11, wherein the indicative depth represents depth corresponding to any of: at least one of other plants in the field, a variation in depth over a time period, an expected depth of one or more substrates for the plant, and an expected depth of other plants having a same type as the plant.

13. A farming machine comprising:
an image acquisition system configured to capture a pair of images of a plant in a field as the farming machine moves through the field, wherein the image acquisition system comprises:
a first image sensor configured to produce color images comprising a plurality of color pixels, the plurality of color pixels comprising (i) one or more color pixels representing the plant in the field, and (ii) one or more color pixels for a particular spectral band, and
a second image sensor configured to produce multispectral images comprising a plurality of multispectral pixels, the plurality of multispectral pixels comprising (i) one or more multispectral pixels representing the plant in the field, and (ii) one or more multispectral pixels for the particular spectral band; and
a controller for:
generating a depth map comprising a plurality of depth pixels representing stereo depth information, the plurality of depth pixels including one or more depth pixels representing the plant in the field, the generating comprising:
identifying an overlapping region between a first field of view in a color image and a second field of view in a multispectral image;
generating stereo depth information from the one or more multispectral pixels of the plurality of pixels in the multispectral image and the one or more color pixels of the plurality of pixels in the color image for the particular spectral band that correspond to the overlapping region; and
encoding the stereo depth information into the plurality of depth pixels of the depth map;
identifying the plant in the plurality of depth pixels of the depth map; and
taking a farming action in the field based on the identified plant in the plurality of depth pixels of the depth map.

14. The farming machine of claim 13, wherein identifying the plant further comprises:
determining at least one of a normalized difference vegetation index calculation and an enhanced vegetation index calculation using the multispectral image; and
identifying the plant based on the determined at least one of the normalized difference vegetation index calculation and the enhanced vegetation index calculation.

15. The farming machine of claim 13, wherein the particular spectral band is red or green.

16. The farming machine of claim 13, wherein generating depth pixels comprises:
estimating a first set of blue pixels for the multispectral image; and
combining the first set of blue pixels with a second set of blue pixels from the color image.

17. The farming machine of claim 16, wherein estimating the first set of blue pixels for the multispectral image comprises:
maintaining a machine learned neural network, the machine learned neural network trained upon overlapping color images and multispectral images; and
applying the maintained machine learned neural network to the multispectral image.

18. The farming machine of claim 13, wherein determining the overlapping region is based on at least one of a hardware configuration and one or more image processing techniques comprising area-based image registration and feature-based image registration.

19. The farming machine of claim 13, wherein identifying the plant further comprises:
identifying one or more depth pixels of the plurality of depth pixels having depth information a threshold distance from an indicative depth, the identified one or more depth pixels comprising pixels representing the plant.

20. The farming machine of claim 19, wherein the indicative depth represents depth corresponding to any of: at least one of other plants in the field, a variation in depth over a time period, an expected depth of one or more substrates for the plant, and an expected depth of other plants having a same type as the plant.

\* \* \* \* \*